April 14, 1931.  A. P. WOOD  1,801,130
METHOD OF MAKING DYNAMO ELECTRIC MACHINES
Filed April 12, 1930
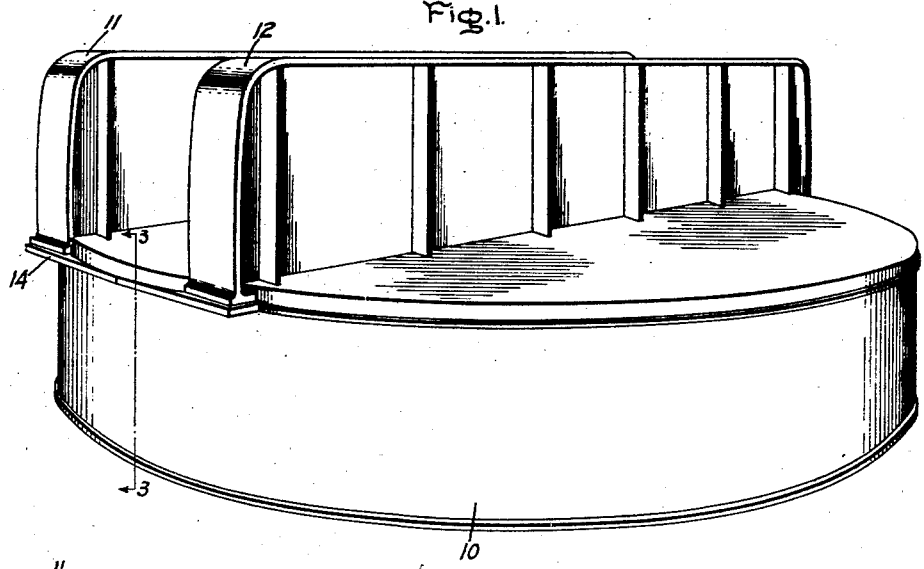
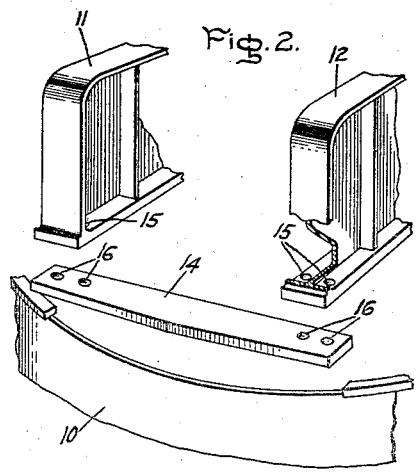
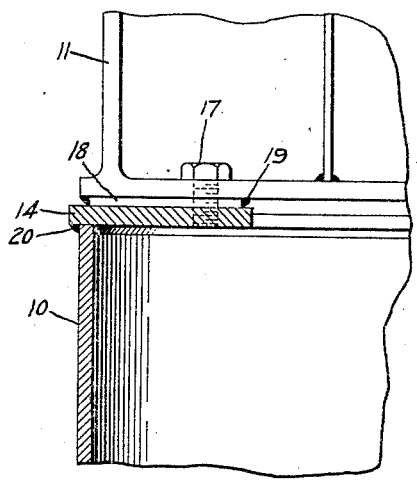
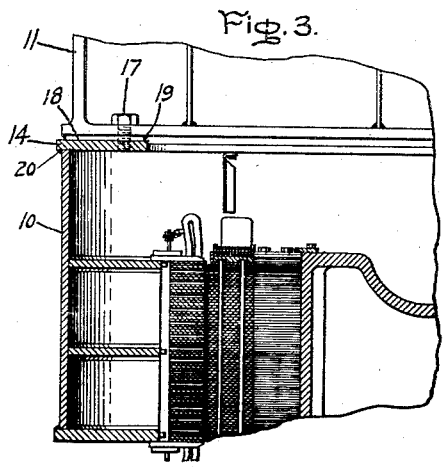
Inventor:
Alexander P. Wood,
by Charles E. Tullar
His Attorney.

Patented Apr. 14, 1931

1,801,130

UNITED STATES PATENT OFFICE

ALEXANDER P. WOOD, OF SCHENECTADY, NEW YORK, ASSIGNOR TO GENERAL ELECTRIC COMPANY, A CORPORATION OF NEW YORK

METHOD OF MAKING DYNAMO-ELECTRIC MACHINES

Application filed April 12, 1930. Serial No. 443,856.

My invention relates to the method of making dynamo-electric machines of the type having a stationary member and a rotatable member supported thereon by a bearing bracket.

In manufacturing dynamo-electric machines of this type it is necessary to secure the bearing bracket to the stationary member of the machine in such position that the rotatable member will be supported coaxially of the stationary member and provide a uniform air gap between the rotatable member and the core structure of the stationary member. In order to accomplish this it has heretofore been necessary to accurately machine surfaces on the stationary member of the machine which are in the same plane and which are exactly at right angles to the axis of the machine. It has also been necessary to accurately machine surfaces on the bearing bracket which are exactly at right angles to the axis of the machine and in the same plane, so that when the bearing bracket was secured to the stationary member the axis of the rotatable member would be exactly centered in the core structure of the stationary member. This is an expensive and troublesome method of manufacture and, particularly, in dynamo-electric machines of large size, such as large alternating current generators, because of the difficulty of handling the frame structure and the bearing bracket, in performing the machining operations, and because of the large and expensive equipment required to carry out the operations.

The object of my invention is to carry out a method of making a dynamo-electric machine of this type which will greatly simplify the work of securing the bearing bracket to the stationary member as required, and will eliminate the necessity of machine work on the bearing bracket and the stationary member. I accomplish this by a method which includes placing the bearing bracket adjacent the stationary member with a plate between them and separably secured to one of them in a position to support the rotatable member and the stationary member coaxially, and then securing the plate to support the bearing bracket.

My improved method will be more fully set forth in the following description referring to the accompanying drawing, and the features of novelty which characterize my method will be pointed out with particularity in the claims annexed to and forming a part of this specification.

In the drawing Fig. 1 is a fragmentary perspective view of a dynamo-electric machine built in accordance with my invention; Fig. 2 is a perspective view showing the bearing bracket, stationary member and plate before they are secured together; Fig. 3 is a fragmentary sectional view on the line 3—3 of Fig. 1 showing the bearing bracket, stationary member and plate arranged in accordance with my improved method, and Fig. 4 is a sectional view similar to Fig. 3 showing the completed construction.

Referring to the drawing, for convenience of illustration, I have shown my improved method as applied to the manufacture of a vertical shaft alternating current generator having a stationary member including a frame 10 having a core structure supported therein in the usual manner, and a rotatable member which is supported on the axis of the stationary member by a sleeve, or combined sleeve and thrust bearing, carried by a bearing bracket so as to form a uniform air gap between the rotatable member and the core structure of the stationary member. The bearing bracket preferably comprises a fabricated structure made of two parallel girders 11 and 12, which are secured at opposite ends thereof to the stationary member and support the bearing of the upper end of the rotatable member intermediate the ends thereof.

In order to avoid the necessity of accurately machining the stationary member and the ends of the girders 11 and 12 constituting the upper bearing bracket of the machine, I construct the same in accordance with my improved method. In carrying out my method I attach the plates 14 to the opposite ends of the girders 11 and 12 by drilling holes 15 in the ends of the girders which are adapted to be aligned with tapped holes 16 in the plate, and then bolt the plates to the ends of the girders as indicated at 17. In this way a separable joint is formed between the plates 14 and the ends of the girders 11 and 12, the lower surface of the ends of the girders being ordinarily smooth enough to fit the upper surfaces of the plates 14. If the lower surfaces of the ends of the girders 11 and 12 need reinforcing or are not smooth enough to fit the plates 14, I weld pads 18 to the lower surface of the ends of the girders, as indicated at 19, the lower surface of the pads 18 conforming with the upper surface of the plates 14 to form a separable joint. I then arrange the bearing bracket on the frame 10 with the plate 14 resting on the outer wall of the frame, as shown in Fig. 3, and accurately align the bearing bracket in such relation to the frame that the axis of the rotatable member of the machine will be supported by the bearing bracket on the axis of the core structure of the stationary member so as to form a uniform air gap between them. The bearing bracket may be aligned by the use of shims or in any other convenient manner. In this position of the bearing bracket the rotatable and stationary members of the machine will be coaxial. I then weld the plates 14 to the opposite ends of the bearing bracket and to the frame 10, as indicated at 20 in Fig. 4, so that the bearing carried by the bearing bracket will permanently support the rotatable member of the machine in the required relation to the stationary member. After the bearing bracket is secured to the stationary member in this manner, upon removal of the bolts 17, the bearing bracket can be removed from the stationary member and replaced in the correct relation thereto as the plane upper surface of the plate 14 and the end surfaces of the ends of the girders 11 and 12 form a separable joint which will support the bearing bracket in the desired relation to the stationary member when they are bolted together again.

Although I have shown my improved method as applied to a dynamo-electric machine of particular construction, I do not desire to be limited thereto, and I intend in the appended claims to cover all modifications which do not depart from the spirit and scope of my invention.

What I claim as new and desire to secure by Letters Patent of the United States, is,—

1. The method of making a dynamo-electric machine having a stationary member and a rotatable member supported thereon by a bearing bracket including, placing the bearing bracket adjacent the stationary member with a plate between them and separably secured to one of them, aligning the bearing bracket in the relation to the frame required to support the rotatable member and the stationary member coaxially, and then securing the plate to support the bearing bracket.

2. The method of making a dynamo-electric machine having a stationary member and a rotatable member supported thereon by a bearing bracket including, separably securing a plate to the bearing bracket, arranging the bearing bracket with the plate adjacent the stationary member in position to support the rotatable and stationary members coaxially, and securing the plate to the stationary member.

3. The method of making a dynamo-electric machine having a stationary member and a rotatable member supported thereon by a bearing bracket including separably securing a plate to the bearing bracket, arranging the bearing bracket with the plate adjacent the stationary member in position to support the rotatable and stationary members coaxially, and welding the plate to the stationary member.

4. The method of making a dynamo-electric machine having a stationary member and a rotatable member supported thereon by a bearing bracket having plates removably secured to the ends thereof including, placing the bearing bracket adjacent the stationary member with the plates resting on the stationary member in position to support the rotatable and stationary members coaxially, and securing the plates to the stationary member.

5. The method of making a dynamo-electric machine having a stationary member and a rotatable member supported thereon by a bearing bracket having plates removably secured to the ends thereof including, placing the bearing bracket adjacent the stationary member with the plates resting on the stationary member in position to support the rotatable and stationary members coaxially, and welding the plates to the stationary member.

In witness whereof, I have hereunto set my hand this 11th day of April, 1930.

ALEXANDER P. WOOD.